United States Patent
Höller et al.

(10) Patent No.: US 6,450,305 B1
(45) Date of Patent: Sep. 17, 2002

(54) HYDRODYNAMIC RETARDER WITH THERMALLY COMPENSATED BALANCING RING

(75) Inventors: Heinz Höller; Manfred Mandlik, both of Crailsheim (DE)

(73) Assignee: Voith Turbo GmbH & co., KG, Heidenheim (DE)

( * ) Notice: Subject to any disclaimer, the term of this patent is extended or adjusted under 35 U.S.C. 154(b) by 0 days.

(21) Appl. No.: 09/424,593

(22) PCT Filed: Mar. 19, 1999

(86) PCT No.: PCT/EP99/01850

§ 371 (c)(1),
(2), (4) Date: Feb. 11, 2000

(87) PCT Pub. No.: WO99/49230

PCT Pub. Date: Sep. 30, 1999

(30) Foreign Application Priority Data

Mar. 24, 1998 (DE) ............................. 198 12 735

(51) Int. Cl.[7] ............................................. F16D 57/02
(52) U.S. Cl. ............................. 188/296; 188/307
(58) Field of Search .......................... 188/290, 293, 188/294, 296, 264 G, 264 R, 307, 151 R, 151 A; 192/216; 403/28, 29; 310/30, 89

(56) References Cited

U.S. PATENT DOCUMENTS 3,311,431 A * 3/1967 Hilliard ...................... 384/493
4,226,485 A * 10/1980 Pruvot ..................... 308/207 R
4,473,309 A 9/1984 Box ............................. 384/278
5,400,878 A * 3/1995 D'Anna et al. ............. 188/306
5,452,997 A * 9/1995 Hekman et al. ............. 418/144
5,585,682 A 12/1996 Konicek et al. ............... 310/89

FOREIGN PATENT DOCUMENTS

DE 196 23 680 A1 2/1997

OTHER PUBLICATIONS

English Translation of International Search Report dated Jul. 30, 1999.

* cited by examiner

Primary Examiner—Christopher P. Schwartz
Assistant Examiner—Xuan Lan Nguyen
(74) Attorney, Agent, or Firm—Marshall, Gerstein, & Borun.

(57) ABSTRACT

The invention relates to hydrodynamic machine, especially a hydrodynamic retarder, comprising a housing, components of the hydrodynamic machine being disposed within the housing, and a balancing element. The housing being constructed of a housing material having a coefficient of thermal expansion, which may be greater than a coefficient of thermal expansion at least one of the components. The balancing element having a coefficient of thermal expansion, which may be about that or greater than the coefficient of thermal expansion of the housing material. Also, the balancing element may be axially adjustable with respect to the housing to engage at least one of the components so as to equalize a gap during heating of the hydrodynamic machine.

23 Claims, 2 Drawing Sheets

HYDRODYNAMIC RETARDER WITH THERMALLY COMPENSATED BALANCING RING

FIELD OF THE INVENTION

The invention concerns a hydrodynamic machine, especially a hydrodynamic retarder, which, in known fashion, has a rotor and a stator, both of which together form a hydrodynamic working chamber. Various liquids are considered as medium, for example, oil or water. The areas of use are in both stationary and mobile fields. DE 196 23 680 A1 can be referred to merely as an example from the variety of publications.

BACKGROUND OF THE INVENTION

During operation of a retarder with specific bearing arrangements, out-of-true running of the rotating parts can occur and therefore contact of such parts on other components. For example, striking of the rotor on the stator can occur, as well as asymmetric wear of seals. In unfavorable cases, this can lead to failure of the entire retarder.

SUMMARY OF THE INVENTION

The underlying task of the invention is to configure a retarder so that out-of-true running and striking of rotating parts is reduced or avoided.

The inventors recognized the following:

If the retarder is hot during operation, this leads to nonuniform expansion of individual components, since these consist of different materials. The essentially cup-shaped retarder housing generally consists of aluminum. It expands more strongly than other components produced from other materials. This is particularly true of the rotor housing, which consists of ferritic material.

Radial play therefore occurs between the retarder housing and the rotor housing. The length changes that develop remain uninfluenced, and the axial forces of the hydrodynamic circuit are taken up by the support ring.

The solution according to the invention consists of providing a balancing element, consisting of a material that has at least roughly the same heat expansion coefficient as the retarder housing.

This has the following effect: If the retarder housing expands, owing to heat development of the retarder, to a certain degree, the balancing element undergoes similar expansion. Warping of the rotor housing over the balancing element therefore occurs with the retarder housing, i.e., centering of the bearing is retained.

Generally, the mentioned balancing element is designed as a ring. If the retarder housing consists of aluminum, as is generally the case, aluminum is also chosen as material for the balancing ring.

BRIEF DESCRIPTION OF THE DRAWINGS

The invention is further explained with reference to the drawing. Part of a drive train is shown, comprising, among other things, a retarder, with two variants, depicted in FIGS. 1 and 2.

DETAILED DESCRIPTION OF THE PREFERRED EMBODIMENT

Figure 1:
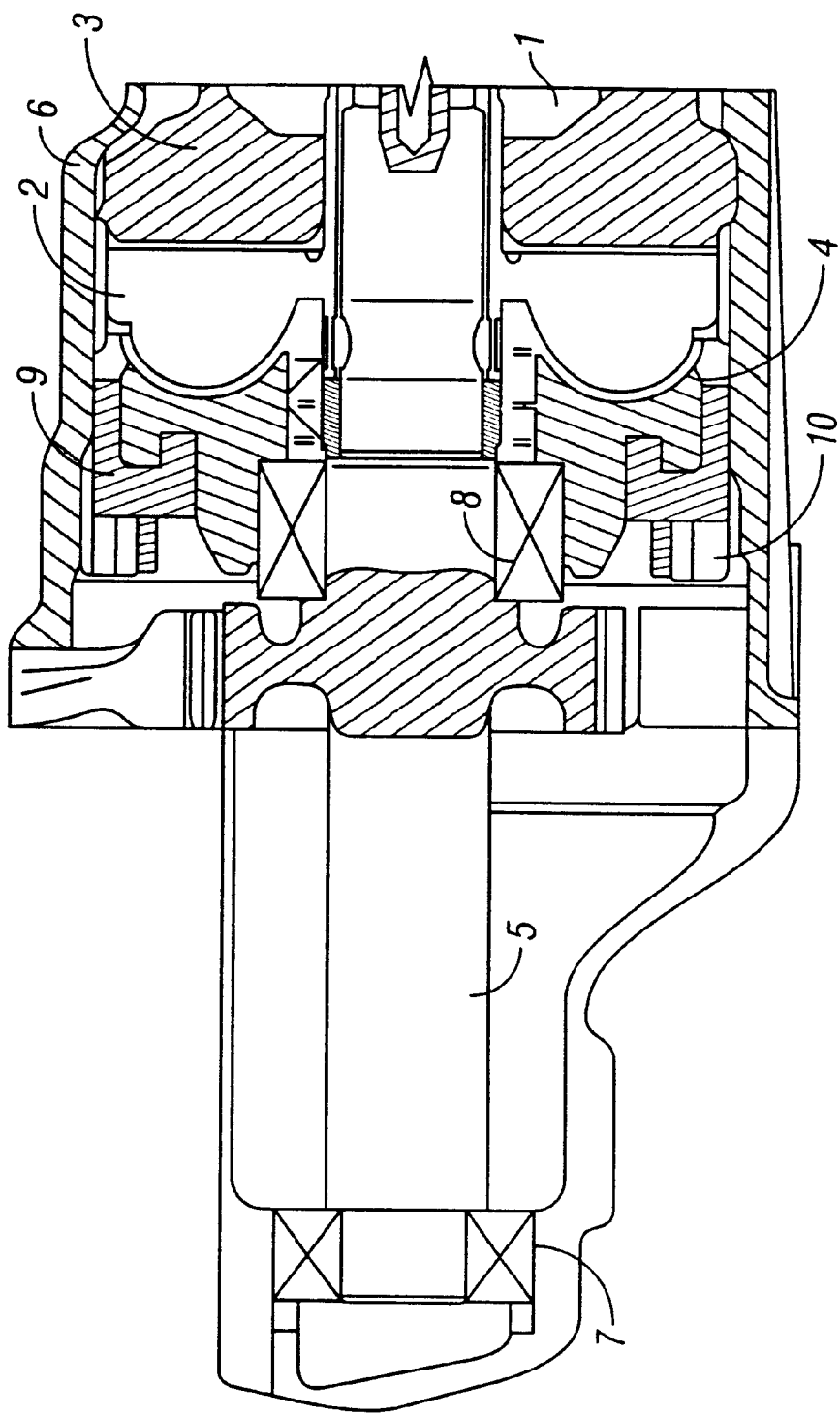

FIG. 1 shows the following, in particular:

The retarder 1 has a rotor 2 and a stator 3. Rotor 2 is surrounded by a rotor housing 4. It is splined on a shaft 5. Rotor 2, stator 3 and rotor housing 4 are enclosed by a retarder housing 6, which is designed cup-shaped. Shaft 5 is mounted in a bearing 7 on the transmission side and a bearing 8 on the retarder side.

According to the invention, a balancing ring 9 is provided. This is essentially U-shaped in cross section. The rotor housing 4 is correspondingly profiled so that the balancing ring engages in shape-mated fashion into the profiling of the rotor housing 4.

A threaded ring 10 with outside threading is screwed into a corresponding inside threading in the retarder housing 6. The balancing ring 9 is thus arranged between threaded ring 10 and rotor housing 4. The balancing ring 9 is therefore situated radially outward and lies on the retarder housing 6.

If heat develops during braking operation of the retarder 1, this leads to expansion of all parts, but to a different degree. The retarder housing 6, consisting of aluminum, then expands particularly strongly. The balancing ring 9 also consists of aluminum and therefore expands to the same degree. The balancing ring 9, on the one hand, is then supported against threaded ring 10 and, on the other hand, exerts a force on rotor housing 4.

Figure 2:
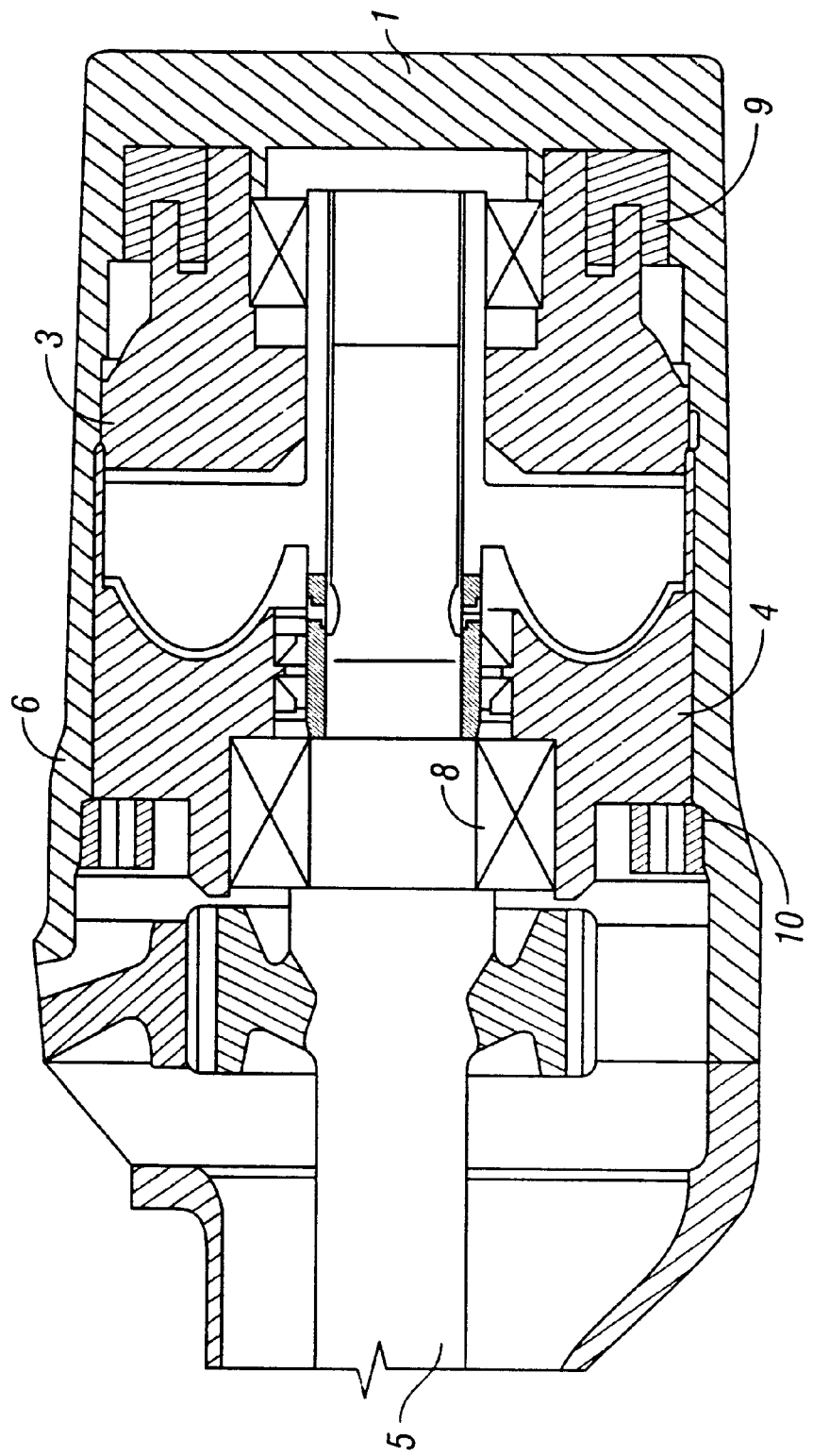

The retarder 1 depicted in FIG. 2 comprises essentially all elements that the retarder 1 according to FIG. 1 also has. The only difference is that the balancing ring 9 is arranged on a different side than in the retarder 1 according to FIG. 1. As is apparent, the balancing ring 9 is situated between the retarder housing 6 and stator 3. Here again, the balancing ring 9 is arranged radially outward, i.e., close to the peripheral wall of housing 6. It is also U-shaped in the cross section shown here. The outward facing end surface of stator 3 is also U-shaped and complementary to the U-shaped configuration of balancing ring 9.

What is claimed is:

1. A hydrodynamic machine, comprising:
    a housing, components of the hydrodynamic machine being disposed within the housing;
    the housing being constructed of a housing material, the housing material having a coefficient of thermal expansion and the coefficient of thermal expansion being greater than a coefficient of thermal expansion of at least one of the components;
    a balancing element, the balancing element having a coefficient of thermal expansion, and the coefficient of thermal expansion of the balancing element being about that or greater than the coefficient of thermal expansion of the housing material; and wherein
    the balancing element being axially adjustable with respect to the housing to engage at least one of the components so as to equalize a gap during heating of the hydrodynamic machine, and the balancing element has one of a U-shape or an L-shape profile.

2. A hydrodynamic machine as in claim 1, wherein the hydrodynamic machine comprises a hydrodynamic retarder, and the components comprise a rotor, a rotor housing surrounding the rotor and a stator.

3. A hydrodynamic machine as in claim 1, wherein the balancing element is coupled to the rotor housing.

4. A hydrodynamic machine as in claim 1, wherein the balancing element is coupled to the stator.

5. A hydrodynamic machine as in claim 1, wherein the balancing element has an annular shape.

6. A hydrodynamic machine as in claim 1, wherein the housing comprises an annular surface including an internal thread and the hydrodynamic machine further comprises:
    a ring including an external thread engaging the internal thread; and the balancing element is arranged between and supported by the threaded ring and the housing.

7. A hydrodynamic machine as in claim 1, wherein the housing is configured to be connected to a transmission.

8. A hydrodynamic machine as in claim 1, wherein the balancing element lies against an inside surface of the housing.

9. A hydrodynamic retarder comprising:

a housing;

a rotor, disposed within a rotor housing, and a stator, the rotor, rotor housing and stator being disposed within the housing;

the housing being constructed of a housing material, the housing material having a coefficient of thermal expansion and the coefficient of thermal expansion being greater than a coefficient of thermal expansion of at least one of the rotor, the rotor housing and the stator;

a balancing element, the balancing element having a coefficient of thermal expansion, and the coefficient of thermal expansion of the balancing element being about that or greater than the coefficient of thermal expansion of the housing material; and wherein the balancing element being axially adjustable with respect to the housing to engage at least one of the rotor, the rotor housing and the stator so as to equalize a gap during heating of the hydrodynamic retarder, and the balancing element has one of a U-shape or an L-shape profile.

10. A hydrodynamic retarder as in claim 9, wherein the balancing element is annular.

11. A hydrodynamic retarder as in claim 10, wherein the housing comprises an annular surface including an internal thread and the hydrodynamic retarder further comprises:

a ring including an external thread engaging the internal thread; and the balancing element is arranged between and supported by the threaded ring and the housing.

12. A hydrodynamic retarder as in claim 11, wherein the balancing element is coupled to the rotor housing.

13. A hydrodynamic retarder as in claim 11, wherein the balancing element is coupled to the stator.

14. A hydrodynamic retarder as in claim 11, wherein the balancing ring lies against an internal surface of the housing.

15. A hydrodynamic retarder as in claim 11, wherein the housing is configured to be connected to a transmission.

16. A hydrodynamic retarder for connection to a transmission, the hydrodynamic retarder comprising:

a housing;

a rotor, disposed within a rotor housing, and a stator, the rotor, rotor housing and stator being disposed within the housing;

the housing being constructed of a housing material, the housing material having a coefficient of thermal expansion and the coefficient of thermal expansion being greater than a coefficient of thermal expansion of at least one of the rotor, the rotor housing and the stator;

a annular balancing element, the balancing element having a coefficient of thermal expansion, and the coefficient of thermal expansion of the balancing element being about that or greater than the coefficient of thermal expansion of the housing material;

the housing being formed to include an annular surface including an internal thread;

a ring including an external thread engaging the internal thread; and the balancing element being arranged between and supported by the threaded ring and the housing to engage one of the rotor, the rotor housing and the stator to equalize a gap during heating of the hydrodynamic retarder.

17. A hydrodynamic retarder as in claim 16, wherein the balancing element is coupled to one of the rotor housing and the stator.

18. A hydrodynamic retarder as in claim 16, wherein the balancing element has one of a U-shape or an L-shape profile.

19. A hydrodynamic retarder as in claim 16, wherein the balancing ring lies against an internal surface of the housing.

20. A hydrodynamic machine, comprising:

a housing, components of the hydrodynamic machine being disposed within the housing;

the housing being constructed of a housing material, the housing material having a coefficient of thermal expansion and the coefficient of thermal expansion being greater than a coefficient of thermal expansion of at least one of the components;

a balancing element, the balancing element having a coefficient of thermal expansion, and the coefficient of thermal expansion of the balancing element being about that or greater than the coefficient of thermal expansion of the housing material;

the housing comprises an annular surface including an internal thread;

a ring including an external thread engaging the internal thread; and wherein the balancing element engages at least one of the components so as to equalize a gap during heating of the hydrodynamic machine, and the balancing element is arranged between and supported by the threaded ring and the housing.

21. A hydrodynamic machine, comprising:

a housing, components of the hydrodynamic machine being disposed within the housing;

the housing being constructed of a housing material, the housing material having a coefficient of thermal expansion and the coefficient of thermal expansion being greater than a coefficient of thermal expansion of at least one of the components;

a balancing element, the balancing element having a coefficient of thermal expansion, and the coefficient of thermal expansion of the balancing element being about that or greater than the coefficient of thermal expansion of the housing material; and wherein the balancing element engages at least one of the components so as to equalize a gap during heating of the hydrodynamic machine, and the balancing element has one of a U-shape or an L-shape profile.

22. A hydrodynamic retarder comprising:

a housing;

a rotor, disposed within a rotor housing, and a stator, the rotor, rotor housing and stator being disposed within the housing;

the housing being constructed of a housing material, the housing material having a coefficient of thermal expansion and the coefficient of thermal expansion being greater than a coefficient of thermal expansion of at least one of the rotor, the rotor housing and the stator;

a balancing element, the balancing element having a coefficient of thermal expansion, and the coefficient of thermal expansion of the balancing element being about that or greater than the coefficient of thermal expansion of the housing material;

the housing comprises an annular surface including an internal thread;

a ring including an external thread engaging the internal thread; and wherein the balancing element engages at least one of the rotor, the rotor housing, and the stator so as to equalize a gap during heating of the hydrodynamic retarder, the balancing element is annular, and the balancing element is arranged between and supported by the threaded ring and the housing.

23. A hydrodynamic retarder as in claim 22, wherein the balancing element has one of a U-shape and an L-shape profile.

* * * * *